US006947905B1

(12) United States Patent
Starr et al.

(10) Patent No.: US 6,947,905 B1
(45) Date of Patent: Sep. 20, 2005

(54) SYSTEM AND METHOD FOR DISPLAYING PLANNING INFORMATION ASSOCIATED WITH A SUPPLY CHAIN

(75) Inventors: Jeffrey H. Starr, Carrollton, TX (US); John Robbins Bush, Jr., South Lake, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/397,423

(22) Filed: Sep. 17, 1999

Related U.S. Application Data (60) Provisional application No. 60/100,975, filed on Sep. 18, 1998.

(51) Int. Cl.[7] ............................................. G06F 17/60

(52) U.S. Cl. .................... 705/37; 705/7; 705/8; 705/78

(58) Field of Search ................................. 705/25–40, 1, 705/7–10; 345/764, 848

(56) References Cited

U.S. PATENT DOCUMENTS

| | | | | |
|---|---|---|---|---|
| 5,136,690 | A | | 8/1992 | Becker et al. ............... 395/161 |
| 5,596,502 | A | * | 1/1997 | Koski et al. .................. 700/95 |
| 5,596,703 | A | | 1/1997 | Erick et al. .................. 395/326 |
| 5,615,109 | A | | 3/1997 | Eder ........................... 395/208 |
| 5,832,532 | A | * | 11/1998 | Kennedy et al. ............. 707/503 |
| 5,953,707 | A | * | 9/1999 | Huang et al. ................. 705/10 |
| 6,049,742 | A | * | 4/2000 | Milne et al. ................... 700/99 |

FOREIGN PATENT DOCUMENTS

| | | | |
|---|---|---|---|
| WO | WO 99/45486 | * | 9/1999 |

OTHER PUBLICATIONS

Moolman et al "A Capital budgeting model based on the project portfolio approach: Avoiding cash flows per project", Engineering Economist, V42n2, PP: 11-135, Winter 1997, Dialog file 15, Accession No. 01407260.*
PCT International Search Report, Aug. 8, 2000.
Simpson, N. C. et al. "Multiple-Stage Production Planning Research: History and Opportunities," *International Journal of Operations & Production Management*, vol. 16, No. 6, pp. 25-40, 1996.
Cowdrick, R. M. "Supply Chain Planning (SCP)—Concepts and Case Studies," *Computers & Industrial Engineering*, vol. 29, No. 1-04, pp. 245-248, Sep. 1, 1995.
Reiner, O. et al. "Isolation of a Miller-Dieker Lissencephaly Gene Containing G Protein Beta-Subunit-Like Repeats," *Nature*, vol. 364, No. 6439, pp. 717-721, Aug. 19, 1993.
International Preliminary Examining Authority Written Opinion, Oct. 18, 2000.

* cited by examiner

*Primary Examiner*—Frantzy Poinvil
(74) *Attorney, Agent, or Firm*—James E. Walton; Brian E. Harris (57) ABSTRACT

A system operating on at least one computer for displaying planning information associated with a supply chain includes an enterprise model, a planning engine, and a presentation interface. The enterprise model represents a supply chain that involves a plurality of products and resources. The planning engine uses the enterprise model to generate planning information for the supply chain according to one or more specified constraints and one or more optimization criteria. The presentation interface generates a first visual display for selected planning information. The first visual display includes a cashflow report providing a net present value for one or more products in the supply chain. Each net present value reflects revenues and expenses associated with a corresponding product according to time periods in which the revenues and expenses occur.

44 Claims, 9 Drawing Sheets

FIG. 1

| NPV Rate | 20% | Compounded: | 4 | times/year | | | | |
|---|---|---|---|---|---|---|---|---|
| Product (Group) | | NPV | 06/29 Profit | 07/01 | 08/01 | 09/01 | 10/01 |
|---|---|---|---|---|---|---|---|
| ALL | | 193,459,648.00 | -8,443,458.00 | -36,183,048.00 | 92,756,768.00 | 55,839,208.00 | 100,348,840.00 |
| FLAT | | 135,059,712.00 | -4,749,057.00 | -16,398,776.00 | 61,322,520.00 | 40,821,312.00 | 61,366,836.00 |
| SLABS | | 29,265,110.00 | -2,415,088.75 | 6,323,684.00 | 13,874,560.00 | 5,396,086.00 | 7,284,024.00 |
| ├── SLAB_Thick | | 26,895,952.00 | -1,610,536.88 | 7,131,706.00 | 10,983,182.00 | 6,004,124.00 | 5,436,629.50 |
| └── SLAB_Thin | | 2,369,152.50 | -804,551.81 | -808,023.00 | 2,891,377.00 | -608,042.00 | 1,845,393.00 |
| HOT ROLLED | | 5,219,031.00 | 0.00 | 0.00 | 0.00 | -2,110,827.25 | 7,709,308.50 |
| ├── HR_Light_Gauge | | 51,456.48 | 0.00 | 0.00 | 0.00 | -23,758.38 | 78,995.91 |
| └── HR_Heavy_Gauge | | 5,167,575.00 | 0.00 | 0.00 | 0.00 | -2,087,068.75 | 7,630,313.00 |
| COLD ROLLED | | 100,575,584.00 | -2,333,967.75 | -22,722,458.00 | 47,447,968.00 | 37,536,056.00 | 46,373,500.00 |
| ├── CR_Full-Hard | | 49,877.00 | 0.00 | 0.00 | 0.00 | -57,032.29 | 111,103.71 |
| ├── CR_Full-Finished | | 5,387,133.00 | 0.00 | 0.00 | 0.00 | -5,231,130.00 | 11,057,688.00 |
| ├── CR_Galvanized | | 94,940,824.00 | -2,333,967.75 | -22,722,458.00 | 47,447,968.00 | 42,960,488.00 | 34,855,336.00 |
| └── CR_Galvaneal | | 197,745.91 | 0.00 | 0.00 | 0.00 | -136,271.72 | 349,372.84 |
| LONG | | 58,399,924.00 | -3,694,401.25 | -19,784,272.00 | 31,434,240.00 | 15,019,896.00 | 38,982,016.00 |
| BILLETS | | 12,799,423.00 | -1,026,058.06 | -2,700,235.00 | 6,440,407.00 | -1,283,810.00 | 12,162,538.00 |
| ├── Round_Billets | | 11,813,854.00 | -1,026,058.06 | -2,700,235.00 | 6,440,407.00 | 1,400,952.00 | 8,390,160.00 |
| └── Square_Billets | | 985,569.25 | 0.00 | 0.00 | 0.00 | -2,684,763.75 | 3,772,377.75 |
| WIRE RODS | | 27,096,196.00 | -1,085,428.62 | -6,982,842.00 | 11,217,820.00 | 11,873,416.00 | 13,631,241.00 |
| ├── WR_Thin | | 309,154.00 | 0.00 | 0.00 | 0.00 | -1,214,273.62 | 1,561,829.50 |
| └── WR_Thick | | 26,789,044.00 | -1,085,428.62 | -6,982,842.00 | 11,217,820.00 | 13,087,692.00 | 12,069,411.00 |
| BARS | | 18,502,306.00 | -1,582,914.75 | -10,101,193.00 | 13,776,016.00 | 4,428,290.00 | 13,188,237.00 |
| ├── Bar_Thin | | 11,196.58 | 0.00 | 0.00 | 0.00 | -51,390.70 | 64,084.84 |
| └── Bar_Thick | | 18,491,108.00 | -1,582,914.75 | -10,101,193.00 | 13,776,016.00 | 4,479,680.00 | 13,124,152.00 |

Financial Report | Cost Input | Product Seller Rev | Seller Product Rev

SYSTEM AND METHOD FOR DISPLAYING PLANNING INFORMATION ASSOCIATED WITH A SUPPLY CHAIN

CROSS REFERENCE TO RELATED APPLICATIONS

This application claims the benefit of Ser. No. 60/100,975, entitled "Supply Chain Management Tool With Profit Optimization," filed Sep. 18, 1998.

This application is related to U.S. application Ser. No. 09/374,461 now U.S. Pat. No. 6,577,304 entitled "System and Method for Visually Representing a Supply Chain," filed Aug. 13, 1999, and U.S. application Ser. No. 09/397,473 now U.S. Pat. No. 6,486,899 entitled "System and Method for Displaying Logistics Information Associated with a Supply Chain," filed Sep. 17, 1999.

TECHNICAL FIELD OF THE INVENTION

This invention relates generally to the field of enterprise resource planning and, more particularly, to a system and method for displaying planning information associated with a supply chain.

BACKGROUND OF THE INVENTION

Business enterprises use computer-implemented management systems to model supply chains and to provide plans for producing and delivering products and services to customers. Typically, management systems address planning decisions as constrained optimization problems. For example, in a manufacturing environment, a management system may schedule a sequence of tasks for a piece of manufacturing equipment. The management system might specify start times for each task according to one or more optimization criteria, such as minimizing inventory, maximizing profit, or maximizing resource utilization. The management system might also consider various constraints, such as the capabilities of the equipment or deadlines by which products must be delivered to customers. Previous systems are inadequate for many needs, particularly with respect to the manner in which planning information associated with supply chains is provided to users of these systems.

SUMMARY OF THE INVENTION

In accordance with the present invention, a system and method for displaying planning information associated with a supply chain is provided that substantially reduces or eliminates disadvantages and problems associated with previous supply chain management systems and methods.

According to one embodiment of the present invention, a system operating on at least one computer for displaying planning information associated with a supply chain includes an enterprise model, a planning engine, and a presentation interface. The enterprise model represents a supply chain that involves a plurality of products and resources. The planning engine uses the enterprise model to generate planning information for the supply chain according to one or more specified constraints and one or more optimization criteria. The presentation interface generates a first visual display for selected planning information. The first visual display includes a cashflow report providing a net present value for one or more products in the supply chain. Each net present value reflects revenues and expenses associated with a corresponding product according to time periods in which the revenues and expenses occur.

The system and method of the present invention provide a number of important technical advantages. The present invention describes a variety of reports that visually display planning information to a user. Using the reports, a supply chain planner can more effectively understand the dynamic problems and performance issues associated with a supply chain, and can better solve and optimize a supply chain plan. Additional technical advantages will be readily apparent to those skilled in the art.

BRIEF DESCRIPTION OF THE DRAWINGS

To provide a more complete understanding of the present invention, and for further features and advantages thereof, reference is now made to the following description taken in conjunction with the accompanying drawings, in which:

FIG. 2 illustrates an exemplary planning cashflow report according to the present invention;

DETAILED DESCRIPTION OF THE INVENTION

Figure 1:
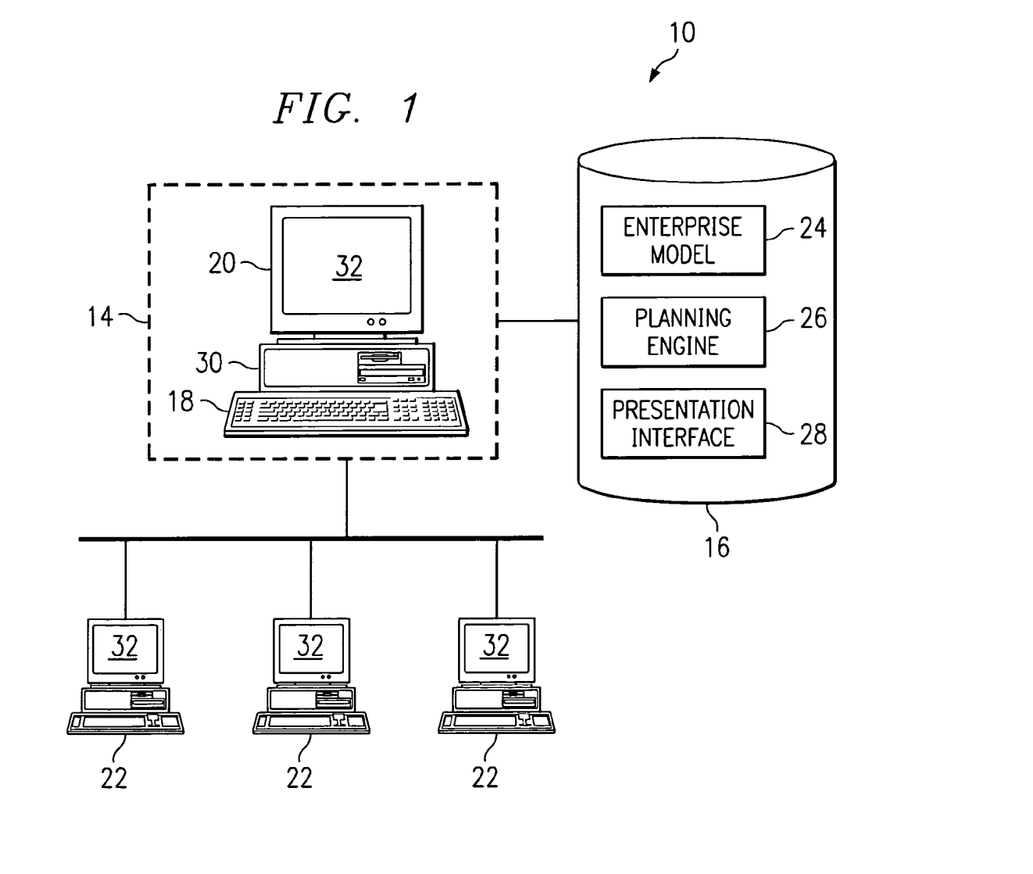
FIG. 1 illustrates an exemplary system for managing a supply chain.

FIG. 1 illustrates an exemplary system 10 for managing a supply chain. System 10 includes a computer 14, a memory 16, an input device 18, and an output device 20. As described in further detail below, system 10 generates a visual display 32 that presents to a user planning information relating to a supply chain. The supply chain may exist entirely within a single enterprise or may span a number of enterprises, and the planning information may relate to procuring raw materials or component parts, manufacturing, distribution, transportation, warehousing, sales, or any other suitable activity involved in providing products to customers or flow within the supply chain.

Memory 16 contains an enterprise model 24, a planning engine 26, and a presentation interface 28. Enterprise model 24, planning engine 26, and presentation interface 28 represent software components that are each responsible for a separate set of well-defined tasks. In a particular embodiment, enterprise model 24, planning engine 26, and presentation interface 28 are implemented using object-oriented programming techniques. Although a particular software implementation is described with reference to FIG. 1, system 10 contemplates any suitable combination of hardware, software, or both hardware and software that implements the described functionality. Although memory 16 is illustrated as external to computer 14 in FIG. 1, memory 16 may be external or integral to computer 14 according to particular needs. Memory 16 may include volatile memory, non-volatile memory, or both.

Enterprise model 24 represents a supply chain in terms of its products and their component parts. To produce and deliver products to customers, an enterprise must use resources to perform various activities. These resources may include raw materials, component parts, labor, manufacturing facilities and equipment, distribution channels, transportation resources, warehouses, sales support, or any other resources that may affect the enterprise's ability to produce and deliver products to customers. For profit optimization planning, enterprise model 24 generates, for each product in a supply chain, cash inflows and cash outflows that represent revenues and expenses associated with the products. In a particular embodiment, model 24 calculates expenses by representing costs according to the times at which the costs occur. This method of calculating expenses more accurately reflects the time value of money than an accrual method that does not recognize costs until a sale occurs. Model 24 includes raw material costs, operation costs, inventory carrying costs, handling costs, or any other suitable costs that accompany supply chain activities in any suitable combination. In a particular embodiment, model 24 stores raw material costs in terms of dollars/unit, operation costs in terms of dollars/unit or dollars/hour, inventory carrying costs in terms of dollars/unit/time, and handling costs in terms of dollars/unit.

Using enterprise model 24, planning engine 26 generates planning information relating to the supply chain being modeled. The planning information may relate to long-term, short-term, or any other planning horizon and may include various level of detail. For example only and not by way of limitation, the planning information may describe aggregate levels of production over several years or schedules of daily activities relating to specific products and resources. To generate the planning information, engine 26 attempts to maximize or minimize one or more optimization criteria while satisfying specified constraints. The optimization criteria may include minimizing inventory, maximizing profit, maximizing resource utilization, maximizing profit margins, or any other suitable criteria according to particular needs. The constraints may include resource requirements, resource availability, material requirements, material availability, process run rates and yields, demand, contractual demand fulfillment requirements, order commitments, initial on-hand inventories, maximum and minimum inventory amounts, customer priority or any other factors that may affect decisions of the enterprise in providing products to customers. In a particular embodiment, engine 26 generates a plan that optimizes profit by maximizing the net present values of cashflows in model 24, where net present value is defined as:

ΣRevenue-ΣRaw Material Costs-ΣOperation Expenses-ΣCarrying Costs

In other embodiments, engine 26 may maximize profit in terms other than net present value.

Engine 26 may use one or more customer priority constraints to provide hierarchical "layered-demand" planning. This feature permits recognition of specified customer priorities. For example, dealings with a particular customer may provide strategic advantages for the enterprise despite lower profit margins associated with servicing the customer. Engine 26 also permits the user to simulate and evaluate proposed plans and business scenarios. In a particular embodiment, a user may test scenarios by changing a demand for a product, production volume of a product, resource capacity, inventory levels, or any other suitable constraints.

Presentation interface 28 provides a user interface for inputting data affecting model 24, for scenario analysis of model 24, and for viewing planning information generated by engine 26. Based on the planning information generated by engine 26, presentation interface 28 generates several supply chain reports, singly or in any suitable combination, which are described in further detail below with reference to FIGS. 2–9.

Enterprise model 24, planning engine 26, and presentation interface 28 operate on one or more computers 14 that include at least one processor 30. Computer 14 receives information from a user using an input device 18, which may include a keyboard, mouse, touch-screen, microphone, or any other device that accepts information. Computer 14 presents visual display 32 to the user using output device 20, which may include a computer monitor, a projector, a printer, or any other suitable device with a display screen or other visual output capability. In a particular embodiment, computer 14 is a network server, and users interact with computer 14 using one or more client computers 22. In such an embodiment, client computers 22 may provide planning information to various personnel at geographically distributed locations.

FIGS. 2–9 illustrate exemplary visual displays 32 generated by presentation interface 28 and displayed using output device 20. Although the supply chain reports in FIGS. 2–9 relate to the steel industry, presentation interface 28 may generate and output device 20 may display similar supply chain reports relating to any suitable single-enterprise or multi-enterprise industry or supply chain environment. In a particular embodiment, visual display 32 presents the reports in one or more application windows that include pull-down menus, tool bars, or other suitable graphical user interfaces to receive commands, instructions, options, or other input from a user. Using any of the supply chain reports described with reference to FIGS. 2–9, a user can simulate and evaluate proposed supply chain plans developed by planning engine 26.

FIG. 2 illustrates an exemplary cashflow report 40 that provides a net present value of the cashflows associated with each product in a supply chain. In cashflow report 40, a product panel 42 lists various products produced during a specified time frame, organized by product group or in any other suitable manner. A net present value ("NPV") panel 44 lists the net present value of the cashflows associated with each product. As indicated in NPV panel 44, enterprise model 24 associates revenues and expenses with end products, which permits presentation interface 28 to list cashflows separately for each product. This capability may be especially significant for industries where a resource or raw material may be used to make multiple end products. For example, the steel-making industry may use a hot strip mill to produce a number of end products. The net present value information in NPV panel 44 reflects supply chain revenues and expenses discounted according to the time periods in which the revenues and expenses occur. Cashflow report 40 specifies a discount rate 48 and a yearly compound number 50. Using discount rate 48 and compound number 50, planning engine 26 calculates the net present value information displayed in NPV panel 44. In a particular embodiment, a user may modify discount rate 48 and compound number 50 to view various scenarios under alternative assumptions.

A profit panel 46 divides the profits or other cashflows associated with each product into a number of different time periods. Each column 52 displays cashflows during a particular time period. The time period may be a day, week, month, quarter, year, or any other suitable time period according to particular needs. As an alternative to, or in addition to cashflow report 40, an income statement report (not shown) may provide, for each product, a net income that reflects costs according to the time periods in which related revenues are realized.

Figure 3:
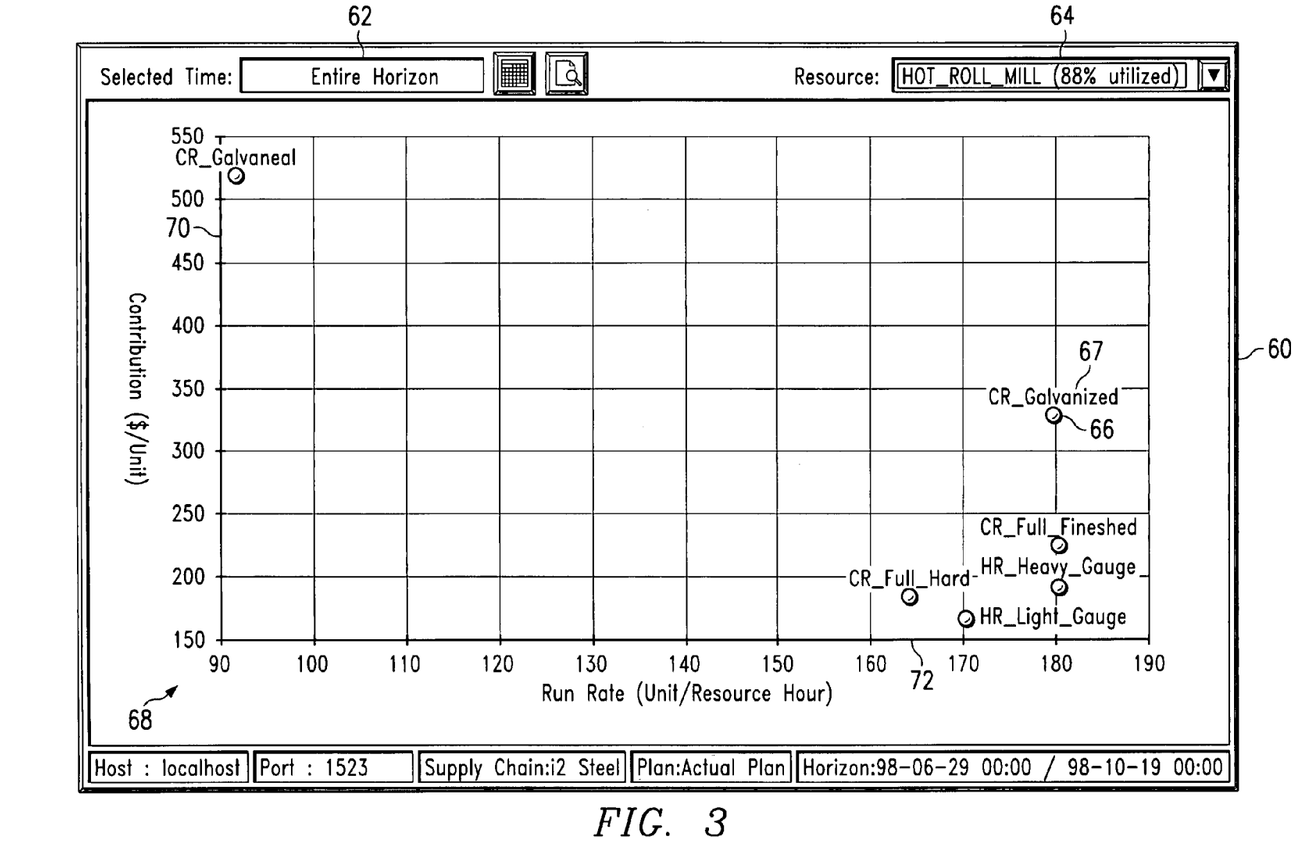
FIG. 3 illustrates an exemplary profit margin report according to the present invention.

FIG. 3 illustrates an exemplary profit margin report 60 indicating, for each product related to a selected resource, a profit margin per time interval use of the selected resource. In an entry box 62, report 60 specifies a time horizon that may be modified by a user. The time horizon may be limited to a day, week, month, quarter, year, or any other suitable time period, or may be unlimited as shown in the illustrated embodiment. Using a pull-down selector 64, a user selects a resource in the supply chain. In the illustrated embodiment, a user has selected a manufacturing facility, specifically a hot roll mill. As indicated in pull-down selector 64, the hot roll mill has an 88 percent utilization rate. Report 60 represents products associated with the selected resource using nodes 66 labeled by product identifiers 67. Report 60 displays nodes 66 on a graph 68 to indicate, for each product, a profit margin per time interval use of the selected resource.

In the illustrated embodiment, graph 68 indicates profit margins per resource hour, although graph 68 may indicate profits margin averaged over a day, week, quarter, year, or any other suitable time interval for measuring use of the selected resource. Graph 68 breaks down the parameter of profit margin per resource hour into two dimensions: profit margin per unit and units per resource hour. If the two dimensions are multiplied, the result is in terms of margin per resource hour. A first axis 70, labeled "Contribution," provides a scale illustrating a profit margin per unit for each product represented by one of nodes 66. A second axis 72, labeled "Run Rate," provides a scale illustrating a rate at which the selected resource processes each product represented by one of nodes 66. Products represented by nodes 66 in the upper right of graph 68 have the highest margin per resource hour.

Figure 4:
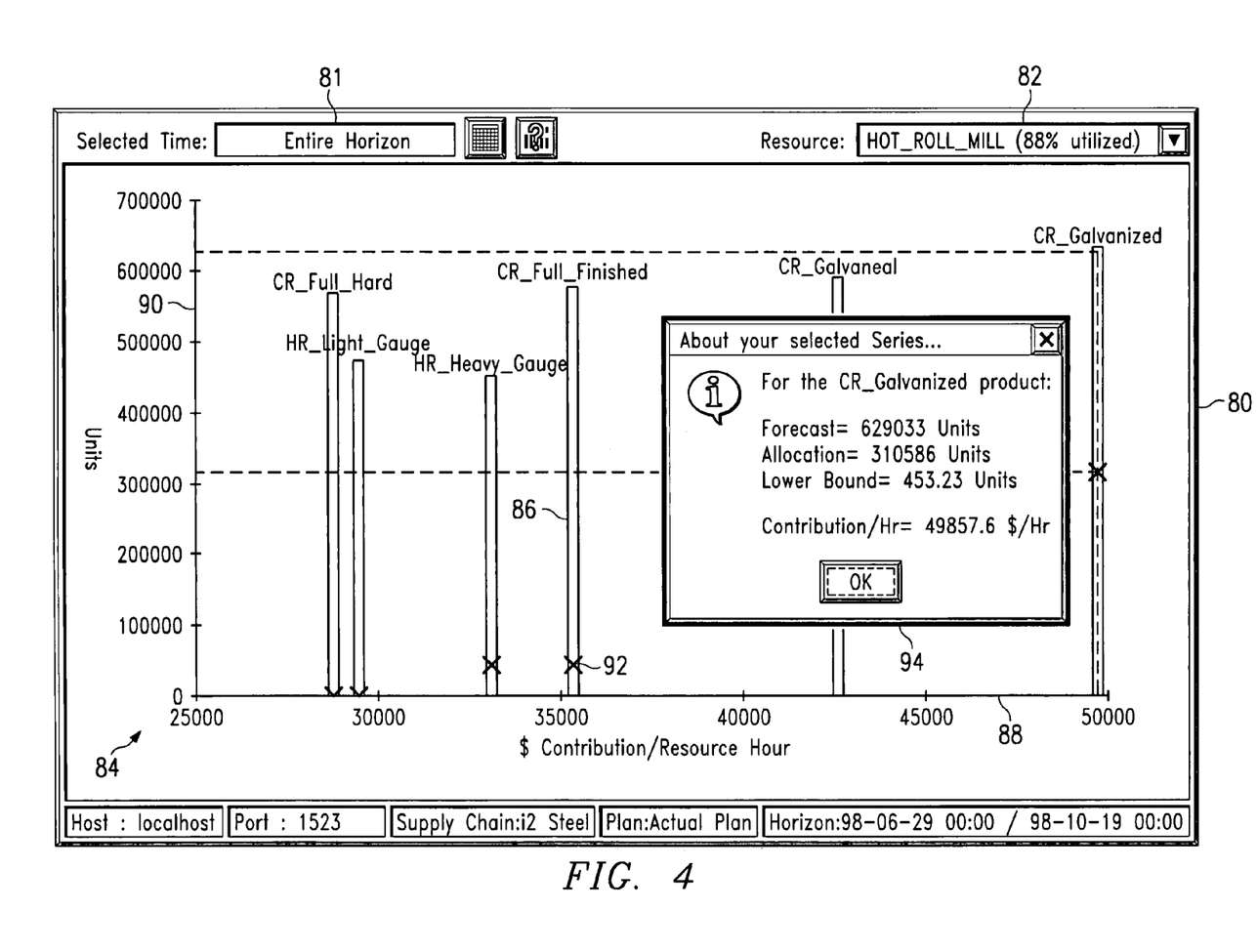
FIG. 4 illustrates an exemplary allocation according to the present invention.

FIG. 4 illustrates an exemplary resource allocation report 80 indicating, for each product associated with a selected resource, a forecasted demand and a number of units allocated for production. As described above with reference to FIG. 3, a user selects a time horizon using an entry box 81 and a resource in the supply chain using a pull-down selector 82. As shown, the user has again selected the hot roll mill with an 88 percent utilization rate. Product allocation report 80 displays a bar graph 84 that includes a bar 86 for each product associated with the selected resource. A first axis 88 is scaled in terms of profit margin per resource hour and a second axis 90 is scaled in terms of number of units. Each bar 86 is associated with a first position on first axis 88 and indicates a profit margin per resource hour for an associated product. The total length of each bar 86 indicates a forecasted demand in terms of the number of units that could be sold if customer demand were satisfied. A marker 92 on each bar 86 indicates the number of units actually allocated for production. Because, in the illustrated embodiment, system 10 allocates production resources, such as the selected hot roll mill, to maximize profit, products having higher margins per resource hour have a higher number of units allocated for production. Graph 84 illustrates this relationship in that markers 92 appear higher on bars 86 that are positioned further to the right on first axis 88.

In response to a user selecting one of the products associated with the hot roll mill, presentation interface 28 generates a pop-up box 94 specifying numerical values for the forecasted demand, the allocated production, and the profit margin per resource hour for the selected product. In a particular embodiment, pop-up box 94 also indicates a "lower bound," representing a minimum production allocation. The user may select a product for which pop-up box 94 is generated by clicking on an associated bar 86 or marker 92.

Figure 5:
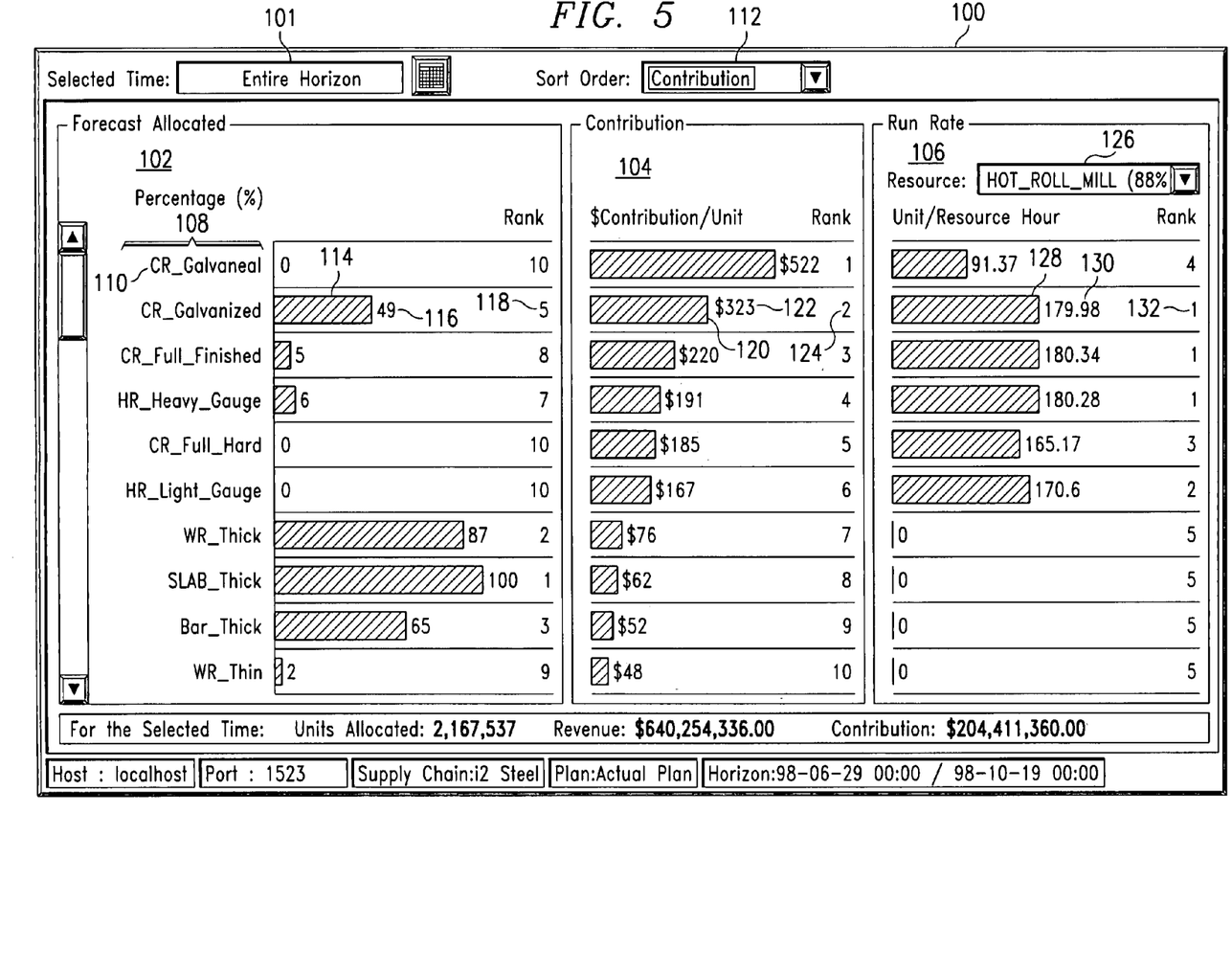
FIG. 5 illustrates an exemplary product report according to the present invention.

FIG. 5 illustrates an exemplary product report 100 indicating, for each product, a percentage of forecasted demand satisfied by allocated production, a profit margin per unit, and a rate at which units are processed by a selected resource. In entry box 101, report 100 specifies a time horizon that may be modified by a user as described above with reference to FIG. 3. Product report 100 includes a list 108 of product identifiers 110. A user may select a sort criterion using pull-down selector 112 to cause presentation interface 28 to sort list 108 according to the selected criterion. In the illustrated embodiment, a user has selected "Contribution" as the sort criterion and, in response, presentation interface 28 has sorted list 108 of product identifiers 110 according to the profit margin per unit of each product.

Product report 100 includes a forecast allocated bar graph 102, a contribution bar graph 104, and a run rate bar graph 106. Forecast allocated bar graph 102 associates each product identifier 110 with a bar 114 indicating a percentage of forecasted demand allocated for production. In the illustrated embodiment, bar graph 102 also includes numerical values 116 indicating the percentages of forecasted demand allocated for production and ranks 118 indicating the relative sizes of the percentages.

Contribution bar graph 104 associates each product identifier 110 with a bar 120 indicating each identified product's profit margin per unit. In the illustrated embodiment, bar graph 104 also associates each product identifier 110 with a numerical value 122 indicating the profit margin per unit and a rank 124 indicating the relative sizes of the profit margins. Because presentation interface 28 sorted list 108 of product identifiers 110 according to contribution in the illustrated embodiment, ranks 124 appear in order of the relative sizes of profit margins.

Run rate bar graph 106 associates each product identifier 110 with a bar 128 indicating a rate at which units are processed by a selected resource. Using pull-down selector 126, a user selects a resource in the supply chain. In the illustrated embodiment, a user again has selected the hot roll mill with an 88 percent utilization rate. In response to the user selection, run rate bar graph 106 associates each product identifier 110 with a bar 128 indicating a rate at which the selected resource, in this case the hot roll mill, processes units of each identified product. In the illustrated embodiment, run rate bar graph 106 also includes numerical values 130 indicating the rates of processing and ranks 132 indicating relative relationships among the processing rates. Although the processing rates are specified in terms of units produced per hour, processing rates may be determined over days, weeks, months, quarters, years, or any other suitable time periods.

Figure 6:
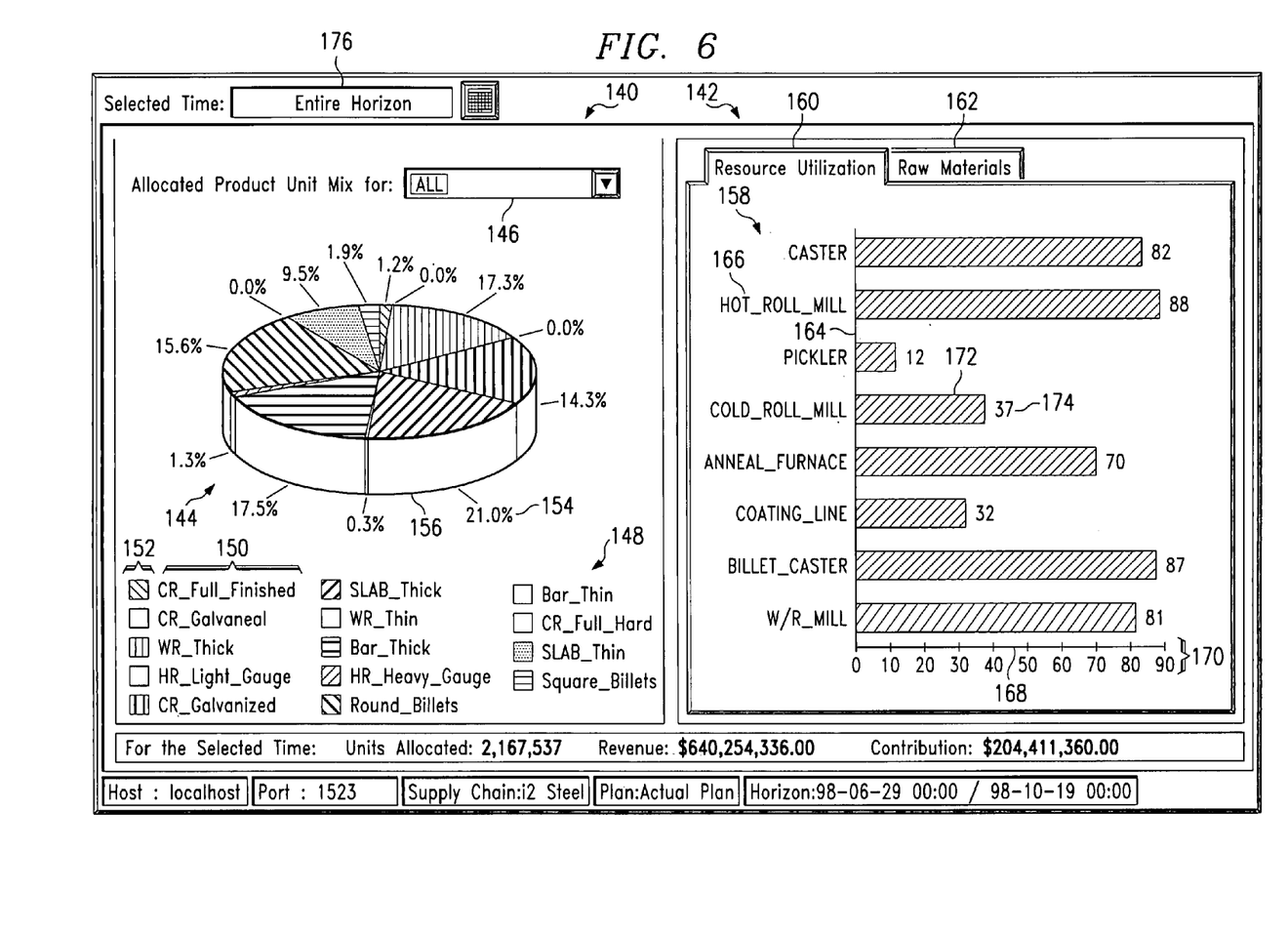
FIG. 6 illustrates a product mix report according to the present invention.

FIG. 6 illustrates an exemplary product mix report 140 indicating several products' shares of an allocated mix of production, and a utilization report 142 indicating the percentages of resources or raw materials utilized in a production plan. Product mix report 140 includes a pie chart 144 indicating several products' share of an allocated mix of production. Using pull-down selector 146, a user may choose to view each product's share of the total allocated production or a portion of the allocated production. A legend 148 associates product identifiers 150 with display characteristics 152 of sections 156 of pie chart 144. In the illustrated embodiment, product mix report 140 also specifies percentage values 154 associated with each section 156 of pie chart 144.

Utilization report 142 includes a bar graph 158 indicating the percentages of raw materials or resources utilized in a production plan generated by planning engine 26. In the illustrated embodiment, utilization report 142 includes a resource utilization tab 160 and a raw materials tab 162, such that a user may elect to view either resource utilization information or raw material utilization information, respectively. In the illustrated embodiment, either by default or in response to a user selection, utilization report 142 displays resource utilization information. Bar graph 158 includes an axis 164 with resource identifiers 166 and an axis 168 scaled according to percentages 170. Each resource identifier 166 is associated with a bar 172 extending from axis 164 a length indicative of each identified resource's percent utilization. In the illustrated embodiment, bar graph 158 also includes values 174 specifying percent utilizations for each resource identifier 166. If a user were to select tab 162, bar graph 158 would indicate the percent of purchased raw materials utilized according to a production plan generated by engine 26.

Figure 7:
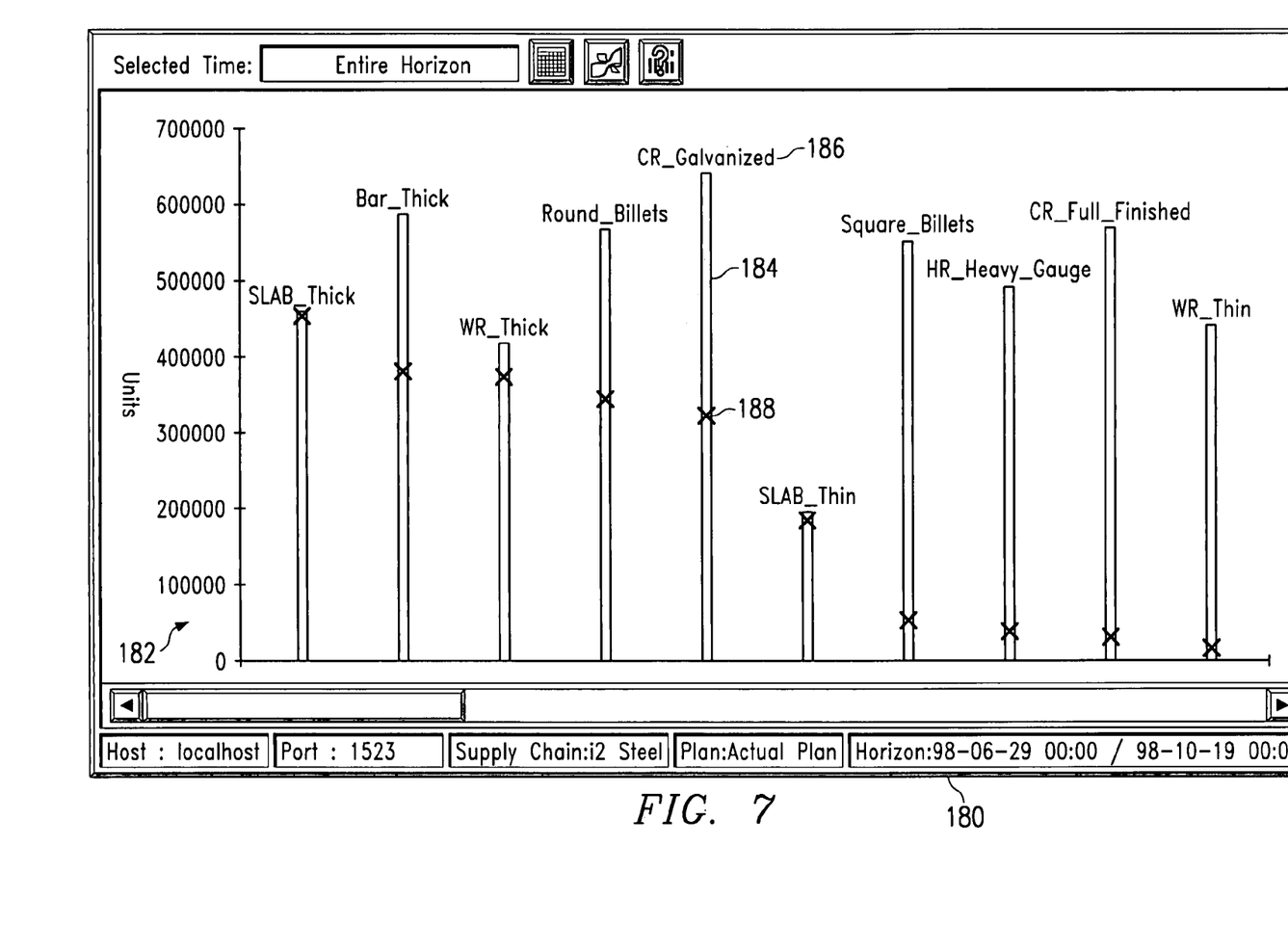
FIG. 7 illustrates a production report according to the present invention.

FIG. 7 illustrates an exemplary production report 180 indicating, for each product, a forecasted demand and a number of units allocated for production. Production report 180 is similar to resource allocation report 80 in FIG. 4 but, unlike resource allocation report 80, production report 180 displays all products without regard to whether the products are associated with a selected resource and does not include an axis scaled according to profit margin per resource hour. Like resource allocation report 80, production report 180 includes a bar graph 182 with bars 184 associated with products in a supply chain. Each bar 184 is labeled with a product identifier 186. The length of each bar 184 indicates a forecasted demand for each identified product, and marker 188 on each bar 184 indicates a number of units allocated for production according to the planning information generated by engine 26.

Figure 8:
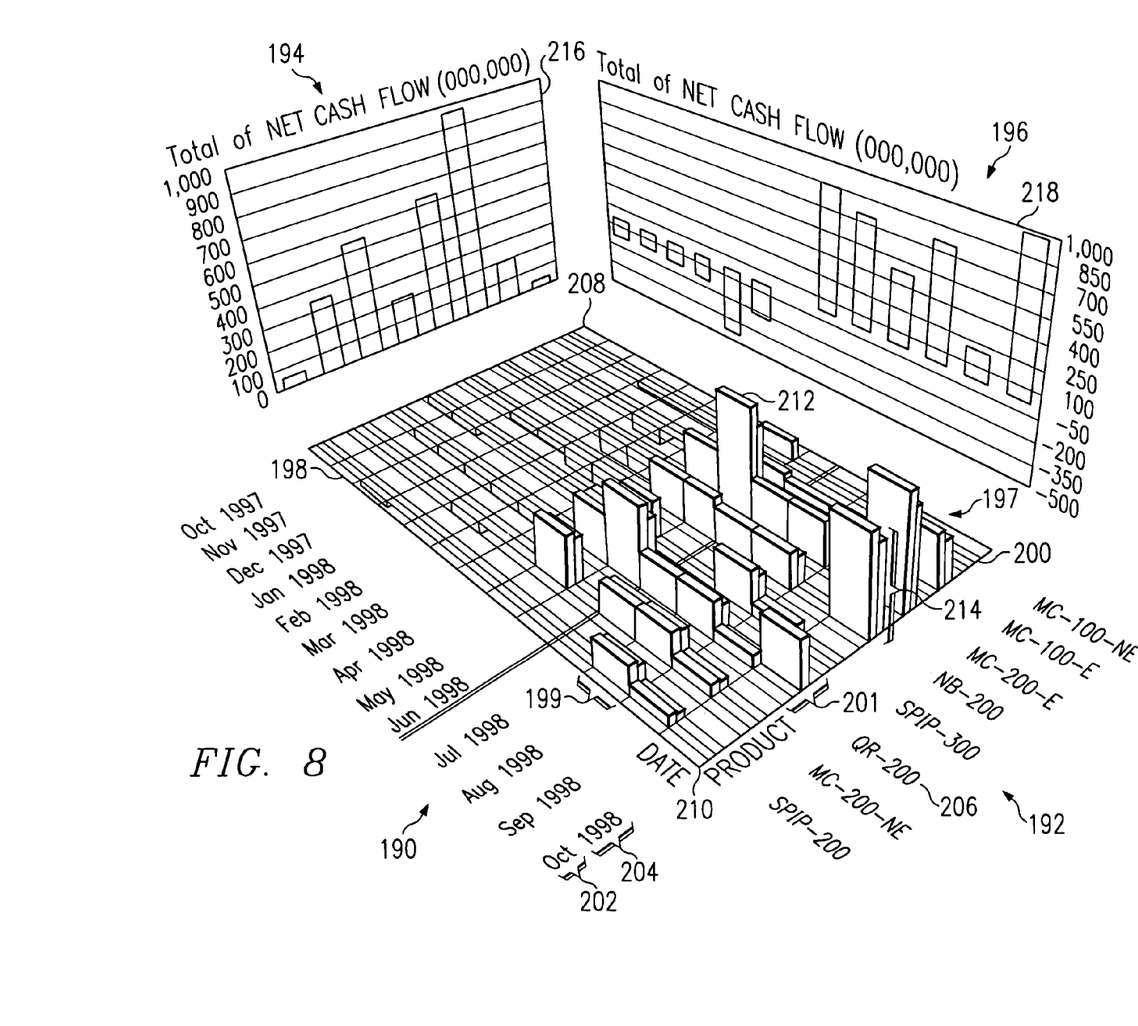
FIG. 8 illustrates a three-dimensional cashflow report according to the present invention.

FIG. 8 illustrates an exemplary three-dimensional cashflow report 190 indicating cashflows associated with various products and time periods. Presentation interface 28 may generate such three-dimensional reports to provide, in a single window, coordinated information that would otherwise require several windows and might be more difficult to interpret for a user. Cashflow report 190 includes a bottom panel 192, a left panel 194, and a right panel 196. Bottom panel 192 displays a three-dimensional bar graph 197. A first axis 198 is divided into intervals 199 according to time periods and a second axis 200 is divided into intervals 201 according to products in a supply chain. Time period intervals 199 along first axis 198 are labeled by a month 202 and a year 204, and product intervals 201 along second axis 200 are labeled by product identifiers 206. Although the time periods are months in the illustrated embodiment, the time periods may be days, weeks, months, quarters, years, or any other suitable time periods.

Time period intervals 199 and product intervals 201 intersect to form a grid 208. Each box 210 in grid 208 is associated with a particular combination of a time period and a product, and each box 210 includes a bar 212 having a height 214 indicating a number of units of the associated product produced during the associated time period. In response to a user selecting one of bars 212, presentation interface 28 may generate a pop-up window (not shown) specifying numerical values related to the time period and product associated with selected bar 212. Left panel 194 displays a two dimensional bar graph 216 of net cashflow for each product across all time periods. Right panel 196 displays a two-dimensional bar graph 218 of net cashflow in each time period across all products.

Figure 9:
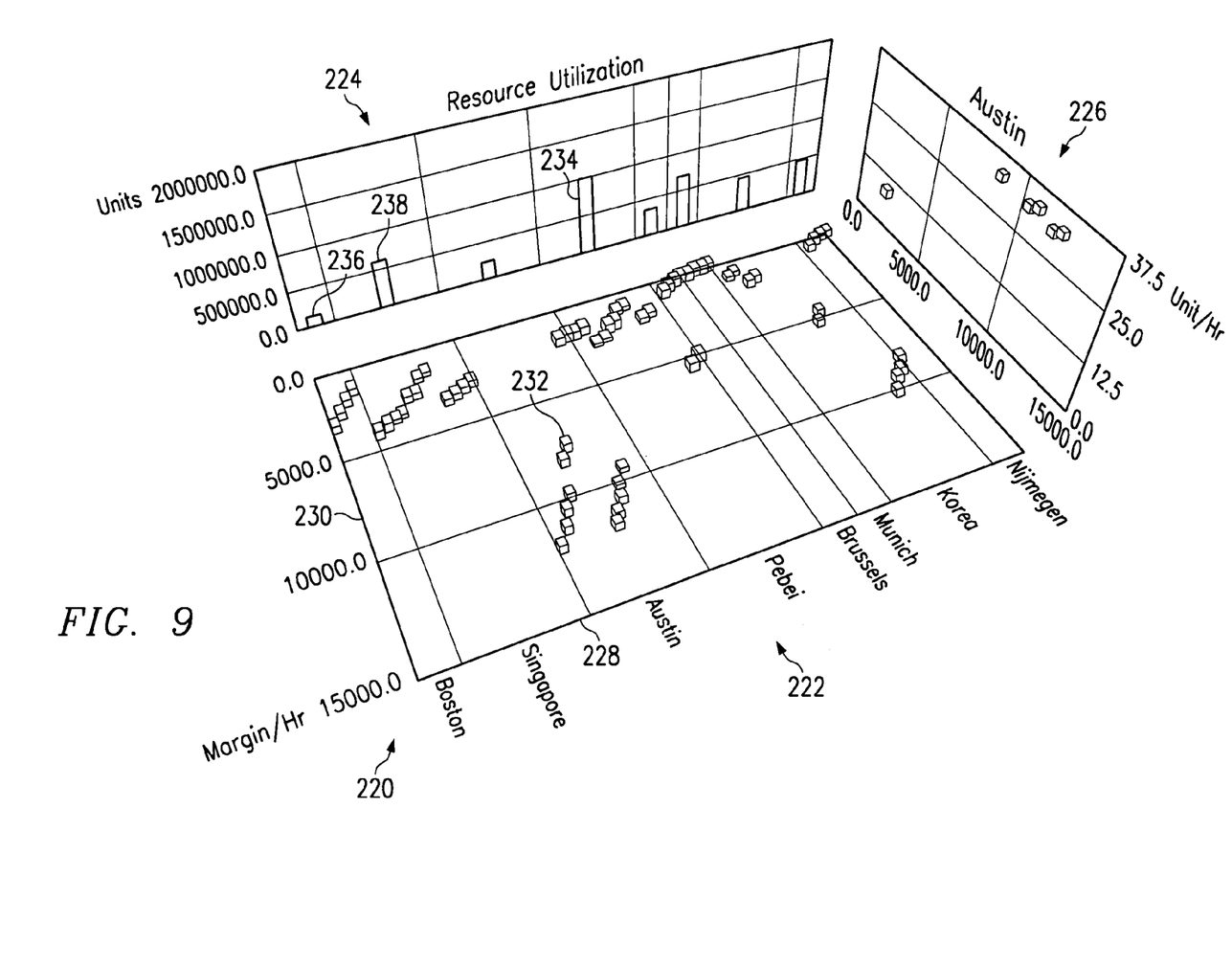
FIG. 9 illustrates a three-dimensional plant distribution report according to the present invention.

FIG. 9 illustrates an exemplary three-dimensional plant distribution report 220 indicating planning information related to specific plant locations. Plant distribution report includes a bottom panel 222, a left panel 224, and a right panel 226. Bottom panel 222 displays different plant locations along a first axis 228 and margins per hour along a second axis 230. Icons 232 in bottom panel 222 represent products or resources in a supply chain and are each associated with a particular plant location along first axis 228 and a particular profit margin per hour along second axis 230.

Left panel 224 displays planning information relating to the locations specified along first axis 228 according to a selected parameter. A user selects a parameter using a menu, tool bar, or in any other suitable manner. Although a user has selected resource utilization as the parameter in the illustrated embodiment, left panel 224 may display planning information relating to profit margins per unit, profit margins per hour, rates of production, forecasted demands, allocated production, net present values, cash flows, costs, or any other parameter relating to a supply chain. Each bar 234 on left panel 224 corresponds to a location at the same position on first axis 228 of bottom panel 222. In other words, a first bar 236 corresponds to the "Boston" location, a second bar 238 corresponds to the "Singapore" location, etc. Thus, a user can quickly determine a location's margin rate and resource utilization using bottom panel 222 and left panel 224, respectively. Right panel 226 displays additional data for a selected location. A user selects a location and a parameter using a menu, tool bar, or in any other suitable manner. In the illustrated embodiment, a user has selected "Austin" and units per hour.

Although the present invention has been described with several embodiments, a person skilled in the art could make various alterations, modifications, and additions without departing from the spirit and scope of the present invention as defined in the appended claims.

What is claimed is:

1. A system for displaying planning information associated with a supply chain, comprising:

at least one computer having one or more processing unit having:

a planning engine for accessing an enterprise model representing a supply chain that involves a plurality of products and resources and for using the enterprise model to generate planning information for the supply chain according to one or more specified constraints and one or more optimization criteria; and a presentation interface for generating a visual display for selected planning information, the visual display comprising a cashflow report providing a net present value for one or more products in the supply chain, each net present value reflecting revenues and expenses associated with a corresponding product according to time periods in which the revenues and expenses occur, the cashflow report comprising a three-dimensional display comprising:

a first panel including a first axis specifying a plurality of products, a second axis specifying a plurality of time periods, and a plurality of bars each associated with a particular time period and a particular product, each bar having a height relating to a number of units of the associated product produced during the associated time period;

a second panel including a bar graph indicating a net cash flow for each of the products specified by the first axis in the first panel; and a third panel including a bar graph indicating a net cash flow for each of the time periods specified by the second axis in the first panel.

2. The system of claim 1, wherein the presentation interface further generates a visual display for the selected planning information comprising a second cashflow report that includes a two-dimensional display comprising:

a first panel presenting a list of the products;

a second panel presenting the net present value for each listed product; and a third panel presenting a plurality of columns, each column corresponding to a specified time period and providing a net cashflow associated with each listed product during that time period.

3. The system of claim 1, wherein in the cashflow report three-dimensional display:

the first panel comprises a bottom panel;

the second panel comprises a left panel; and the third panel comprises a right panel.

4. The system of claim 1, wherein the presentation interface further generates a visual display comprising a product report, the product report comprising:

a first bar graph indicating, for one or more products in the supply chain, a percentage of forecasted demand satisfied by allocated production;

a second bar graph indicating a profit margin per unit for each of the products; and a third bar graph indicating, for each of the products, a number of units produced for each time interval a specified resource is in use.

5. The system of claim 1, wherein the presentation interface further generates a visual display comprising a product mix report that includes a pie chart indicating one or more products' share of an allocated mix of production.

6. The system of claim 1, wherein the presentation interface further generates a visual display comprising a utilization report that indicates, for a plurality of resources, a percentage of time during which each resource is in use.

7. The system of claim 1, wherein the presentation interface further generates a visual display comprising a utilization report that indicates, for a plurality of purchased raw materials, a percentage of each raw material that is utilized.

8. A system for displaying planning information associated with a supply chain, comprising:

at least one computer having one or more processing unit:

a planning engine for accessing an enterprise model representing a supply chain that involves a plurality of products and resources and for using the enterprise model to generate planning information for the supply chain according to one or more specified constraints and one or more optimization criteria; and a representation interface for generating a visual display for selected planning information, the visual display comprising a profit margin report that indicates, for one or more products associated with a specified resource, a profit margin for each time interface the resource is in use, the profit margin report including a graph comprising:

a first axis scaled in terms of profit margins per unit;

a second axis scaled in terms of numbers of units produced for each time interval the specified resource is in use; and a plurality of nodes representing the products associated with the specified resource, each node located at a position in the graph corresponding to the values for the product on the first and second axes.

9. The system of claim 8, wherein the presentation interface further generates a second visual display comprising a product report, the product report comprising:

a first bar graph indicating, for one or more products in the supply chain, a percentage of forecasted demand satisfied by allocated production;

a second bar graph indicating a profit margin per unit for each of the products; and a third bar graph indicating, for each of the products, a number of units produced for each time interval a specified resource is in use.

10. The system of claim 8, wherein the presentation interface further generates a visual display comprising a product mix report that includes a pie chart indicating one or more products' share of an allocated mix of production.

11. The system of claim 8, wherein the presentation interface is further operable to generate a visual display comprising a utilization report that indicates, for a plurality of resources, a percentage of time during which each resource is in use.

12. The system of claim 8, wherein the presentation interface further generates a visual display comprising a utilization report that indicates, for a plurality of purchased raw materials, a percentage of each raw material that is utilized.

13. A system for displaying planning information associated with a supply chain, comprising:

at least one computer having at least one or more processing unit:

a planning engine for accessing an enterprise model representing a supply chain that involves a plurality of products and resources and for using the enterprise model to generate planning information for the supply chain according to one or more specified constraints and one or more optimization criteria; and a presentation interface for generating a visual display for selected planning information, the visual display comprising a report that indicates, for one or more products in the supply chain, a forecasted demand and a number of units allocated for production;

the report including a bar graph comprising:

a first axis scaled in terms of numbers of units;

a bar, associated with a product in the supply chain, extending from a second axis to a height corresponding to a first position on the first axis, the first position indicating a number of units of the product that could be sold according to customer demand; and a marker on the bar corresponding to a second position on the first axis, the second position indicating a number of units of the product allocated for production.

14. The system of claim 13, wherein the report indicates, for one or more products associated with a specified resource, a forecasted demand and a number of units allocated for production.

15. The system of claim 14, wherein the report includes a bar graph comprising:

a first axis scaled in terms of profit margins for each time interval the specified resource is used;

a second axis scaled in terms of number of units;

a bar, associated with a product associated with the specified resource, extending from a first position on the first axis to a height corresponding to a second position on the second axis, the first position indicating a profit margin for each time interval the specified resource is in use with respect to the product associated with the bar, the second position indicating a number of units of the product associated with the bar that could be sold according to customer demand; and a marker on the bar corresponding to a third position on the second axis, the third position indicating a number of units of the product associated with the bar allocated for production.

16. The system of claim 13, wherein the presentation interface further generates a visual display comprising a product report, the product report comprising:

a first bar graph indicating, for one or more products in the supply chain, a percentage of forecasted demand satisfied by allocated production;

a second bar graph indicating a profit margin per unit for each of the products; and a third bar graph indicating, for each of the products, a number of units produced for each time interval a specified resource is in use.

17. The system of claim 13, wherein the presentation interface further generates a visual display comprising a product mix report that includes a pie chart indicating one or more products' share of an allocated mix of production.

18. The system of claim 13, wherein the presentation interface further generates a visual display comprising a utilization report that indicates, for a plurality of resources, a percentage of time during which each resource is in use.

19. The system of claim 13, wherein the presentation interface further generates a visual display comprising a utilization report that indicates, for a plurality of purchased raw materials, a percentage of each raw material that is utilized.

20. A system for displaying planning information associated with a supply chain, comprising:

at least one computer having one or more processing unit:

a planning engine for accessing an enterprise model representing a supply chain that involves a plurality of products and resources and for using the enterprise model to generate planning information for the supply chain according to one or more specified constraints and one or more optimization criteria; and a presentation interface for generating a visual display for selected planning information, the visual display comprising a plant distribution report that includes a bottom panel comprising:

a first axis specifying a plurality of locations;

a second axis specifying profit margins per hour; and a plurality of icons representing resources in the supply chain, each icon positioned relative to the first axis to indicate a location associated with a corresponding resource and relative to the second axis to indicate a profit margin per hour associated with the corresponding resource.

21. The system of claim 20, wherein the plant distribution report further comprises a side panel displaying bars corresponding to the locations specified by the first axis in the bottom panel, each bar providing information relating to a selected parameter.

22. The system of claim 20, wherein the plant distribution report further comprises a side panel displaying planning information relating to a selected location from the first axis in the bottom panel.

23. A method operating on at least one computer for displaying planning information associated with a supply chain, comprising:

at a planning engine, accessing an enterprise model representing a supply chain that involves a plurality of products and resources;

at the planning engine, using the enterprise model to generate planning information for the supply chain according to one or more specified constraints and one or more optimization criteria; and at a presentation interface, generating a visual display for selected planning information, the visual display comprising a cashflow report providing a net present value for one or more products in the supply chain, each net present value reflecting revenues and expenses associated with a corresponding product according to time periods in which the revenues and expenses occur, the cashflow report comprising a three-dimensional display comprising:

a first panel including a first axis specifying a plurality of products, a second axis specifying a plurality of time periods, and a plurality of bars each associated with a particular time period and a particular product, each bar having a height relating to a number of units of the associated product produced during the associated time period;

a second panel including a bar graph indicating a net cash flow for each of the products specified by the first axis in the first panel; and a third panel including a bar graph indicating a net cash flow for each of the time periods specified by the second axis in the bottom first panel.

24. The method of claim 23, further comprising, at the presentation interface, generating a visual display for the selected planning information comprising a second cashflow report comprising a two-dimensional display comprising:

a first panel presenting a list of the products;

a second panel presenting the net present value for each listed product; and a third panel presenting a plurality of columns, each column corresponding to a specified time period and providing a net cashflow associated with each listed product during that time period.

25. The method of claim 23, wherein in the cashflow report three-dimensional display:

the first panel comprises a bottom panel;

the second panel comprises a left panel; and the third panel comprises a right panel.

26. The method of claim 23, further comprising, at the presentation interface, generating a visual display comprising a product report, the product report comprising:

a first bar graph indicating, for one or more products in the supply chain, a percentage of forecasted demand satisfied by allocated production;

a second bar graph indicating a profit margin per unit for each of the products; and a third bar graph indicating, for each of the products, a number of units produced for each time interval a specified resource is in use.

27. The method of claim 23, further comprising, at the presentation interface, generating a visual display comprising a product mix report that includes a pie chart indicating one or more products' share of an allocated mix of production.

28. The method of claim 23, further comprising, at the presentation interface, generating a visual display comprising a utilization report that indicates, for a plurality of resources, a percentage of time during which each resource is in use.

29. The method of claim 23, further comprising, at the presentation interface, generating a visual display comprising another utilization report that indicates, for a plurality of purchased raw materials, a percentage of each raw material that is utilized.

30. A method operating on at least one computer for displaying planning information associated with a supply chain, comprising:
at a planning engine, accessing an enterprise model representing a supply chain involves a plurality of products and resources:
at the planning engine, using the enterprise model to generate planning information for the supply chain according to one or more specified constraints and one or more optimization criteria, and
at a presentation interface, generating a visual display for selected planning information, the visual display comprising a profit margin report that indicates, for one or more products associated with a specified resource, a profit margin for each time interval the resource is in use, the profit margin report including a graph comprising
a first axis scaled in terms of profit margins per unit;
a second axis scaled in terms of numbers of units produced for each time interval the specified resource is in use; and
a plurality of nodes representing the products associated with the specified resource, each node located at a position in the graph corresponding to the values for the product on the first and second axes.

31. The method of claim 30, further comprising, at the presentation interface, generating a visual display comprising a product report, the product report comprising:
a first bar graph indicating, for one or more products in the supply chain, a percentage of forecasted demand satisfied by allocated production;
a second bar graph indicating a profit margin per unit for each of the products; and
a third bar graph indicating, for each of the products, a number of units produced for each time interval a specified resource is in use.

32. The method of claim 30, further comprising, at the presentation interface, generating a visual display comprising a product mix report that includes a pie chart indicating one or more products' share of an allocated mix of production.

33. The method of claim 30, further comprising, at the presentation interface, generating a visual display comprising a utilization report that indicates, for a plurality of resources, a percentage of time during which each resource is in use.

34. The method of claim 30, further comprising, at the presentation interface, generating a visual display comprising a utilization report that indicates, for a plurality of purchased raw materials, a percentage of each raw material that is utilized.

35. A method operating on at least one computer for displaying planning information associated with a supply chain, comprising:
at a planning engine, accessing an enterprise model representing a supply chain that involves a plurality of products and resources;
at the planning engine, using the enterprise model to generate planning information for the supply chain according to one or more specified constraints and one or more optimization criteria; and
at a presentation interface, generating a visual display for selected planning information, the visual display comprising a report that indicates, for one or more products in the supply chain, a forecasted demand and a number of units allocated for production;
the report including a bar graph comprising:
a first axis scaled in terms of numbers of units;
a bar, associated with a product in the supply chain, extending from a second axis to a height corresponding to a first position on the first axis, the first position indicating a number of units of the product that could be sold according to customer demand; and
a marker on the bar corresponding to a second position on the first axis, the second position indicating a number of units of the product allocated for production.

36. The method of claim 35, wherein the report indicates, for one or more products associated with a specified resource, a forecasted demand and a number of units allocated for production.

37. The method of claim 35, wherein the report includes a bar graph comprising:
a first axis scaled in terms of profit margins for each time interval the specified resource is used;
a second axis scaled in terms of number of units;
a bar, associated with a product associated with the specified resource, extending from a first position on the first axis to a height corresponding to a second position on the second axis, the first position indicating a profit margin for each time interval the specified resource is in use with respect to the product associated with the bar, the second position indicating a number of units of the product associated with the bar that could be sold according to customer demand; and
a marker on the bar corresponding to a third position on the second axis, the third position indicating a number of units of the product associated with the bar allocated for production.

38. The method of claim 35, further comprising, at the presentation interface, generating a second visual display comprising a product report, the product report comprising:
a first bar graph indicating, for one or more products in the supply chain, a percentage of forecasted demand satisfied by allocated production;
a second bar graph indicating a profit margin per unit for each of the products; and
a third bar graph indicating, for each of the products, a number of units produced for each time interval a specified resource is in use.

39. The method of claim 35, further comprising, at the presentation interface, generating a visual display comprising a product mix report that includes a pie chart indicating one or more products' share of an allocated mix of production.

40. The method of claim 35, further comprising, at the presentation interface, generating a visual display comprising a utilization report that indicates, for a plurality of resources, a percentage of time during which each resource is in use.

41. The method of claim 35, further comprising, at the presentation interface, generating a visual display comprising a utilization report that indicates, for a plurality of purchased raw materials, a percentage of each raw material that is utilized.

42. A method operating on at least one computer for displaying planning information associated with a supply chain, comprising:

at a planning engine, accessing an enterprise model representing a supply chain that involves a plurality of products and resources;

at the planning engine, using the enterprise model to generate planning information for the supply chain according to one or more specified constraints and one or more optimization criteria; and at a presentation interface, generating a visual display for selected planning information, the visual display comprising a plant distribution report that includes a bottom panel comprising:

a first axis specifying a plurality of locations;

a second axis specifying profit margins per hour; and a plurality of icons representing resources in the supply chain, each icon positioned relative to the first axis to indicate a location associated with a corresponding resource and relative to the second axis to indicate a profit margin per hour associated with the corresponding resource.

43. The method of claim 42, wherein the plant distribution report further comprises a side panel displaying bars corresponding to the locations specified by the first axis in the bottom panel, each bar providing information relating to a selected parameter.

44. The method of claim 42, wherein the plant distribution report further comprises a side panel displaying planning information relating to a selected location from the first axis in the bottom panel.

* * * * *